(12) United States Patent
Meyer et al.

(10) Patent No.: US 6,809,149 B2
(45) Date of Patent: Oct. 26, 2004

(54) FUNCTIONALIZED SILICAS

(75) Inventors: Jürgen Meyer, Stockstadt/Main (DE); Manfred Ettlinger, Karlstein (DE); Stephanie Frahn, Haibach (DE); Dieter Kerner, Hanua (DE)

(73) Assignee: Degussa AG, Düsseldorf (DE)

( * ) Notice: Subject to any disclaimer, the term of this patent is extended or adjusted under 35 U.S.C. 154(b) by 158 days.

(21) Appl. No.: 09/982,006

(22) Filed: Oct. 19, 2001

(65) Prior Publication Data

US 2002/0077407 A1 Jun. 20, 2002

(30) Foreign Application Priority Data

Oct. 21, 2000 (EP) .............................. 00122954

(51) Int. Cl.[7] .............................. C08J 3/00; C08K 3/20; C08K 9/06; C08L 75/00; C01B 33/12
(52) U.S. Cl. .................. 524/590; 106/287.16; 423/335; 523/200; 523/212; 524/492; 524/493; 524/591; 524/839; 524/840
(58) Field of Search ................................ 524/591, 839, 524/840, 590, 492, 493; 523/200, 212; 423/335; 106/287.16

(56) References Cited

U.S. PATENT DOCUMENTS

| | | | |
|---|---|---|---|
| 5,429,873 A | 7/1995 | Deusser et al. | 428/405 |
| 5,654,090 A | 8/1997 | Kayanoki | 428/329 |
| 5,959,005 A | 9/1999 | Hartmann et al. | 523/213 |
| 6,197,863 B1 | 3/2001 | Eck et al. | 524/430 |

OTHER PUBLICATIONS

European Office Action dated May 4, 2001.
Matsumura, Kazuyuki et al., "Surface Treatment of Silica".
Patent Abstract of Japan, Publication No. 10–204319, Publication Date: Apr. 4, 1998.
Patent Abstract of Japan, Publication No. 05–115772, Publication Date: May 14, 1993.
Patent Abstract of Japan, Publication No. 03–021647, Publication Date: Jan. 30, 1991.
Patent Abstract of Japan, Publication No. 06–172674, Publication Date: Jun. 21, 1994.

*Primary Examiner*—Patrick D. Niland
(74) *Attorney, Agent, or Firm*—Smith, Gambrell & Russell

(57) ABSTRACT

Functionalized silicas with 3-methacryloxypropylsilyl and/or glycidyloxypropylsilyl groups on the surface are prepared by mixing the silicas with the silane and heat-treating the mixture. The silicas are employed, for example, in solvent-containing coatings.

6 Claims, No Drawings

FUNCTIONALIZED SILICAS

INTRODUCTION AND BACKGROUND

The present invention relates to functionalized silicas, a process for their preparation and their use.

It is known to react silicon dioxide obtained by flame hydrolysis and with a surface area of 40 to 200 m²/g with 3-methacryloxypropyltrimethoxysilane. The resulting silicon dioxide is then coated with a further shell of (meth) acrylate polymers and subsequently employed in dental compositions (EP 0 142 784 A1).

SUMMARY OF THE INVENTION

The present invention provides functionalized silicas, characterized by functional groups fixed on the surface, the groups being 3-methacryloxypropylsilyl and/or glycidyloxypropylsilyl.

The present invention also provides a process for the preparation of the functionalized silicas, which is characterized in that a silica is sprayed optionally first with water or dilute acid and then with a surface modification reagent or a mixture of several surface modification reagents in a suitable mixing vessel, with intensive mixing, the components are optionally re-mixed for 15 to 30 minutes and heat-treated at a temperature of 100 to 400° C. over a period of 1 to 6 h.

A silica prepared pyrogenically by the route of flame hydrolysis of $SiCl_4$ can preferably be employed as the silica. Such pyrogenic silicas are known from Ullmanns Enzyklopädie der technischen Chemie [Ullmanns Encyclopaedia of Industrial Chemistry], 4th edition, volume 21, page 464 (1982).

In a preferred embodiment of the invention, a pyrogenic silica with a surface area of approx. 200 m²/g can be employed (Aerosil® 200).

Monomeric substances, such as 3-methacryloxypropyltrialkoxysilane and/or glycidyloxypropyltrialkoxysilane, wherein alkoxy can be methoxy, ethoxy and/or propoxy, can be employed as the surface modification reagent.

The amount of silane can be metered with respect to the silica such that no or only a small excess results. The excess silane can optionally be removed during the heat treatment.

The silica according to the invention can be employed in solvent-containing coatings, for example 2-component polyurethane coatings.

DETAILED DESCRIPTION OF INVENTION

The functionalized silicas according to the invention have the following advantages: When used in solvent-containing coatings, such as, 2-component polyurethane coatings, the scratch resistance of the coating surface is increased.

According to the invention, the pyrogenically prepared silicas according to table 1 can be employed as the silica for the silanization.

TABLE 1

| | | Physico-chemical data of AEROSIL ® | | | | | | | |
|---|---|---|---|---|---|---|---|---|---|
| Test method | | AEROSIL 90 | AEROSIL 130 | AEROSIL 150 | AEROSIL 200 | AEROSIL 300 | AEROSIL 380 | AEROSIL OX50 | AEROSIL TT600 |
| Behaviour towards water | | | | | | | | hydrophilic | |
| Appearance | | | | | | | | loose white powder | |
| BET surface area[1] | m2/g | 90 ± 15 | 130 ± 25 | 150 ± 15 | 200 ± 25 | 300 ± 30 | 380 ± 30 | 50 ± 15 | 200 ± 50 |
| Average primary particle size | nm | 20 | 16 | 14 | 12 | 7 | 7 | 40 | 40 |
| Tamped density approx. values[2] | g/l | 80 | 50 | 50 | 50 | 50 | 50 | 130 | 60 |
| Compacted goods (added "V") | g/l | 120 | 120 | 120 | 120 | 120 | 120 | | |
| VV goods (added "VV")[12] | g/l g/l | | | 50/75 | 50/75 120 | 50/75 120 | | | |
| Loss on drying[3] (2 hours at 105° C.) on leaving supply works | % | <1.0 | <1.5 | <0.5[9] | <1.5 | <1.5 | <2.0 | <1.5 | <2.5 |
| Loss on ignition[4][7] (2 hours at 1000° C.) | % | <1 | <1 | <1 | <1 | <2 | <2.5 | <1 | <2.5 |
| pH[5] | | 3.7–4.7 | 3.7–4.7 | 3.7–4.7 | 3.7–4.7 | 3.7–4.7 | 3.7–4.7 | 3.8–4.8 | 3.6–4.5 |
| $SiO_2$[8] | % | >99.8 | >99.8 | >99.8 | >99.8 | >99.8 | >99.8 | >99.8 | >99.8 |
| $Al_2O_3$[8] | % | <0.05 | <0.05 | <0.05 | <0.05 | <0.05 | <0.05 | <0.08 | <0.05 |
| $Fe_2O_3$[8] | % | <0.003 | <0.003 | <0.003 | <0.003 | <0.003 | <0.003 | <0.01 | <0.003 |
| $TiO_2$[8] | % | <0.03 | <0.03 | <0.03 | <0.03 | <0.03 | <0.03 | <0.03 | <0.03 |
| HCl[8][10] | % | <0.025 | <0.025 | <0.025 | <0.025 | <0.025 | <0.025 | <0.025 | <0.025 |

TABLE 1-continued

| Test method | | AEROSIL 90 | AEROSIL 130 | AEROSIL 150 | AEROSIL 200 | AEROSIL 300 | AEROSIL 380 | AEROSIL OX50 | AEROSIL TT600 |
|---|---|---|---|---|---|---|---|---|---|
| Sieve residue[8] (Mocker method, 45 μm) | % | <0.05 | <0.05 | <0.05 | <0.05 | <0.05 | <0.05 | <0.2 | <0.05 |
| Drum size (net)[11] | kg | 10 | 10 | 10 | 10 | 10 | 10 | 10 | 10 |

[1] in accordance with DIN 66131
[2] in accordance with DIN ISO 787/XI, JIS K 5101/18 (not sieved)
[3] in accordance with DIN ISO 787/II, ASTM D 280. JIS K 5101/21
[4] in accordance with DIN 55921, ASTM D 1208, JIS K 5101/23
[5] in accordance with DIN ISO 787/IX, ASTM D 1208, JIS K 5101/24
[6] in accordance with DIN ISO 787/XVIII, JIS K 5101/20
[7] based on the substance dried for 2 hours at 105° C.
[8] based on the substance ignited for 2 hours at 1000° C.
[9] special packaging protecting against moisture
[10] HCl content is a constituent of the loss on ignition
[11] V goods are supplied in sacks of 20 kg
[12] VV goods are currently supplied only from the Rheinfelden works

EXAMPLE 1

Aerosil® 200 is mixed with 4 parts water and 18 parts 3-methacryloxypropyl-trimethoxysilane (for example DYNASILAN MEMO) and the mixture is heat-treated at 140° C. under an inert gas.

The silica obtained has the following properties:

| | |
|---|---|
| BET [m$^2$/g] | 138 |
| Tamped density [g/l] | 52 |
| pH | 4.6 |
| C content | 5.7 |
| Loss on drying [%] | 0.8 |
| Loss on ignition [%] | 9.7 |
| DBP number [%] | 228 |

EXAMPLE 2

Aerosil® 200 is mixed with 3 parts water and 16 parts 3-glycidyloxypropyl-trimethoxysilane (for example DYNASILAN GLYMO) and the mixture is heat-treated at 140° C. under an inert gas.

The silica obtained has the following properties:

| | |
|---|---|
| BET [m$^2$/g] | 165 |
| Tamped density [g/l] | 53 |
| pH | 4.9 |
| C content | 5.5 |
| Loss on drying [%] | 1.5 |
| Loss on ignition [%] | 8.7 |
| DBP number [%] | 242 |

Experiment 1

A conventional 2-component polyurethane coating has been used to investigate the improvement in the scratch resistance. The recipe for the coating and the preparation, including the application, are summarized in the following:

| Recipe: | | Parts by wt. |
|---|---|---|
| Millbase | Setalux C 1152, XX - 51.50% (Akzo Nobel) | 53.3 |
| | Butyl acetate 98% | 6.7 |
| | Xylene | 6.7 |
| | AEROSIL (silica according to example 1) | 5.0 |
| Σ | | 71.7 |
| Lacquer constituents: | Setalux C 1152, XX - 51.50% (Akzo Nobel) | 1.1 |
| | Xylene | 12.2 |
| | Ethoxypropyl acetate | 1.5 |
| | Butylglycol acetate | 1.5 |
| Hardener: | Desmodur N 75 (Bayer) | 17.0 |
| Σ | | 105.0 |

Binder concentration: 40%
AEROSIL® calculated with respect to the milibase (SC): 18.8%
AEROSIL® calculated with respect to the coating (total): 5%
AEROSIL® calculated with respect to the coating (SC): 12,5%

Preparation and Application of the Coatings

The Setalux is mixed with the solvents. For predispersion, the AEROSIL® is then incorporated into this mixture with a dissolver (disc Ø 45 mm) and predispersed for 5 min at 2000 rpm. The mixture is dispersed in a laboratory bead mill for 30 min at 2500 rpm and a pump output of 60% using glass beads (Ø approx. 1 mm). The dispersing quality is checked with a grindometer, 25 μm, in accordance with DIN ISO 1524. It must be smaller than 10 μm.

The lacquer constituents are added to the millbase in accordance with the recipe, the components being mixed with a blade stirrer at 2000 rpm. The hardener is stirred into the mixture in the same manner.

After the coatings have been adjusted to the spray viscosity according to DIN 53411, the coatings are applied to black-lacquered metal sheets, for example DT 36 (Q-Panel), by means of spraying application (layer thickness about 40–50 μm). After the spraying, the metal sheets are dried for 24 h at room temperature and then for 2 h in a drying oven at 70° C.

Scratching Experiments:

The metal sheets are scoured with a quartz/water slurry (100 g water+1 g Marlon A 350, 0.25%+5 g Millicarb BG) with the aid of a scouring and washing resistance testing machine (Erichsen, brush with pig bristles). The shine before and 10 min after scouring is determined with a reflectometer (20° incident angle).

TABLE 2

Summary of the coating-relevant properties of the liquid coatings and of the films applied and dried:

| | | AEROSIL 200 | Silica/(example 1) | Reference |
|---|---|---|---|---|
| Grindometer value | [μm] | <10 | <10 | — |
| Viscosity (millbase) | [mPas] | | | |
| 6 rpm | | | 1000 | 180 |
| 60 rpm | | 464 | 600 | 143 |
| Viscosity | [mPas] | | | |
| (coating + hardener) 6 rpm | | 166 | 180 | 75 |
| 60 rpm | | 141 | 147 | 62 |
| Dilution (adjustment to 20 s DIN 4 mm) | [%] | 11.5 | 8.5 | 1.7 |
| Scratch resistance | | | | |
| 20° reflectometer value before scratching | | 90.9 | 87.6 | 91.3 |
| 40 strokes with Sikron F 500 | | 66.4 | 73.0 | 50.7 |
| 20° reflectometer value residual shine | | 73.0 | 83.3 | 55.5 |
| 100 strokes with Millicarb BG 20° | | 79.2 | 80.5 | 68.4 |
| reflectometer value residual shine [%] | | 87.1 | 91.9 | 74.9 |

Further variations and modifications of the foregoing will be apparent to those skilled in the art and are intended to be encompassed by the claims appended hereto.

European priority application 00 122 954.1 is relied on and incorporated herein by reference.

We claim:

1. A process for the preparation of functionalized silica, said functionalized silica having at least one functional group fixed on the surface of said silica, the group being selected from the group consisting of 3-methacryloxypropylsilyl, glycidyloxypropylsilyl and mixtures thereof, said method consisting of:

optionally spraying the silica with water or dilute acid, then spraying with a surface modification reagent or a mixture of surface modification reagents in a mixing vessel, mixing the silica and the surface modification reagent(s), optionally re-mixing the silica and the surface modification reagent(s) for 15 to 30 minutes, and heating the silica and the surface modification reagent(s) at a temperature of 100 to 400° C. over a period of 1 to 6 h.

2. A functionalized silica, having at least one functional group fixed on the surface of said silica, the group being selected from the group consisting of 3-methacryloxypropylsilyl, glycidyloxypropylsilyl and mixtures thereof;

wherein the silica is produced by flame hydrolysis; and wherein the functionalized silica is prepared by a process consisting of:

optionally spraying the silica with water or dilute acid, then spraying with a surface modification reagent or a mixture of surface modification reagents in a mixing vessel, mixing the silica and the surface modification reagent(s), optionally re-mixing the silica and the surface modification reagent(s) for 15 to 30 minutes, and heating the silica and the surface modification reagent(s) at a temperature of 100 to 400° C. over a period of 1 to 6 h.

3. The process according to claim 1 wherein the surface modification agent is a member selected from the group consisting of 3-methacryltrialkoxysilane, glycidylotrialkoxysilane and mixtures thereof.

4. A surface coating with a coating containing the functionalized silica according to claim 2.

5. A coating composition comprising the functionalized silica of claim 2 and a solvent.

6. A coating composition for preparing a scratch resistant coating on a surface, comprising the functionalized silica according to claim 2 and a polyurethane.

* * * * *